United States Patent
Yoon et al.

(10) Patent No.: US 11,386,183 B2
(45) Date of Patent: Jul. 12, 2022

(54) SYSTEMS AND METHODS FOR PREDICTIVE CACHING

(71) Applicant: Microstrategy Incorporated, Tysons Corner, VA (US)

(72) Inventors: Chi Ho Yoon, Fairfax, VA (US); Zhijian Xu, Fairfax, VA (US); Ji Jin, Vienna, VA (US); Shrimohan Damani, Aldie, VA (US)

(73) Assignee: MicroStrategy Incorporated, Tysons Corner (VA)

( * ) Notice: Subject to any disclaimer, the term of this patent is extended or adjusted under 35 U.S.C. 154(b) by 0 days.

(21) Appl. No.: 17/382,512

(22) Filed: Jul. 22, 2021

(65) Prior Publication Data

US 2022/0043880 A1 Feb. 10, 2022

Related U.S. Application Data

(60) Provisional application No. 63/061,868, filed on Aug. 6, 2020.

(51) Int. Cl.

| G06F 15/16 | (2006.01) |
|---|---|
| G06F 16/957 | (2019.01) |
| G06F 11/34 | (2006.01) |
| G06F 16/903 | (2019.01) |
| G06F 16/9535 | (2019.01) |

(52) U.S. Cl.
CPC ...... *G06F 16/9574* (2019.01); *G06F 11/3423* (2013.01); *G06F 16/90335* (2019.01); *G06F 16/9535* (2019.01)

(58) Field of Classification Search
None
See application file for complete search history.

(56) References Cited

U.S. PATENT DOCUMENTS

| 9,414,222 | B1* | 8/2016 | Dixon | G06Q 10/04 |
|---|---|---|---|---|
| 9,538,232 | B2* | 1/2017 | Carney | H04N 21/8456 |
| 9,671,851 | B2* | 6/2017 | Luna | H04W 52/02 |
| 2007/0025304 | A1* | 2/2007 | Leelahakriengkrai | ......... |
| | | | | H04W 36/02 |
| | | | | 370/328 |
| 2009/0006308 | A1* | 1/2009 | Fonsen | G06F 16/9574 |
| 2012/0023226 | A1* | 1/2012 | Petersen | H04L 65/80 |
| | | | | 709/224 |
| 2014/0379835 | A1* | 12/2014 | Foerster | H04L 67/2847 |
| | | | | 709/213 |
| 2015/0241941 | A1* | 8/2015 | Luna | H04W 52/0254 |
| | | | | 713/320 |
| 2021/0266353 | A1* | 8/2021 | Grubb | H04N 21/8456 |

\* cited by examiner

*Primary Examiner* — Quang N Nguyen
(74) *Attorney, Agent, or Firm* — Bookoff McAndrews, PLLC

(57) ABSTRACT

A method for predictive caching may include determining previous user activity related to data items and/or documents, receiving a request to view a document from a user, predicting data items to pre-cache based on the previous user activity and at least one other factor, prioritizing the predicted data items for pre-caching, dividing the prioritized data items for pre-caching into a plurality of groups, downloading prioritized data items for each group among the plurality of groups according to the prioritization of the predicted data items, and displaying a view of the document after data items, corresponding to the request, are received.

17 Claims, 7 Drawing Sheets

SYSTEMS AND METHODS FOR PREDICTIVE CACHING

CROSS-REFERENCE TO RELATED APPLICATION

This application claims benefit to U.S. Provisional Patent Application No. 63/061,868, filed on Aug. 6, 2020, the entire contents of which are incorporated herein by reference.

TECHNICAL FIELD

Various embodiments of the present disclosure relate generally to providing access to data on user's devices and, more particularly, to predictive caching of library data.

BACKGROUND

Many documents, such as business reports or web pages displayed in a graphical user interface (GUI), may include a plurality of metrics that may be displayed graphically. These metrics may be partly or entirely derived metrics determined based on other metrics or on underlying data at the time the document is loaded. When accessing and displaying such documents on a user's device, applications commonly store data underlying the documents locally on the user's device to speed up the process of displaying the documents versus fetching all of the data from a server each time the document is displayed. Such data caches can often improve the user experience—especially when displaying large or complex documents requiring large amounts of underlying data. However, users often run into times where the data caches on a device are invalid. This means that even though data may be loaded from the cache quickly, the cached data is not the latest data, and the user may experience delays as the data is reloaded and the cache refreshed. Thus, there is a need for a capability to increase the chances that the cached data stored on a device for a document is current and valid so that the document can be loaded quickly without requiring the user to wait while data is fetched. Such an improved data cache would provide an improved user experience with reduced response time.

The present disclosure is directed to overcoming one or more of these above-referenced challenges.

SUMMARY OF THE DISCLOSURE

According to certain aspects of the present disclosure, systems and methods are disclosed for predictive caching.

In one embodiment, a computer-implemented method is disclosed for predictive caching, the method comprising: determining previous user activity related to data items and/or documents, receiving a request to view a document from a user, predicting data items to pre-cache based on the previous user activity and at least one other factor, prioritizing the predicted data items for pre-caching, dividing the prioritized data items for pre-caching into a plurality of groups, downloading prioritized data items for each group among the plurality of groups according to the prioritization of the predicted data items, and displaying a view of the document after data items, corresponding to the request, are received In accordance with another embodiment, a system is disclosed for predictive caching, the system comprising: a data storage device storing instructions for predictive caching in an electronic storage medium; and a processor configured to execute the instructions to perform a method including: determining previous user activity related to data items and/or documents, receiving a request to view a document from a user, predicting data items to pre-cache based on the previous user activity and at least one other factor, prioritizing the predicted data items for pre-caching, dividing the prioritized data items for pre-caching into a plurality of groups, downloading prioritized data items for each group among the plurality of groups according to the prioritization of the predicted data items, and displaying a view of the document after data items, corresponding to the request, are received.

In accordance with another embodiment, a non-transitory machine-readable medium storing instructions that, when executed by the a computing system, causes the computing system to perform a method for predictive caching, the method including: determining previous user activity related to data items and/or documents, receiving a request to view a document from a user, predicting data items to pre-cache based on the previous user activity and at least one other factor, prioritizing the predicted data items for pre-caching, dividing the prioritized data items for pre-caching into a plurality of groups, downloading prioritized data items for each group among the plurality of groups according to the prioritization of the predicted data items, and displaying a view of the document after data items, corresponding to the request, are received.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that data needed to view a document may be more likely to be pre-loaded on a user device when the user opens the document. The disclosed systems and methods discussed below may allow faster response time to a user request to view a document, possibly resulting in increased user productivity and satisfaction.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to predictive caching of library data.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As discussed above, an invalid or out of date data cache may cause a user to experience delays as the data is reloaded and the cache refreshed. Embodiments of the present disclosure are provided to increase the chances that the cached data stored on a device for a document is current and valid so that the document can be loaded quickly without requiring the user to wait while data is fetched. Such an improved data cache would provide an improved user experience with faster response time.

Figure 1A:
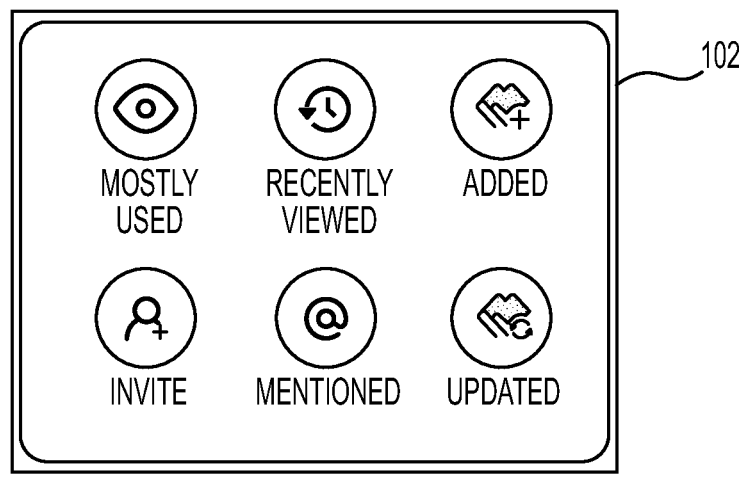
FIGS. 1A-1C depict a process flow in an exemplary method for predictive caching, according to one or more embodiments.
Figure 1B:
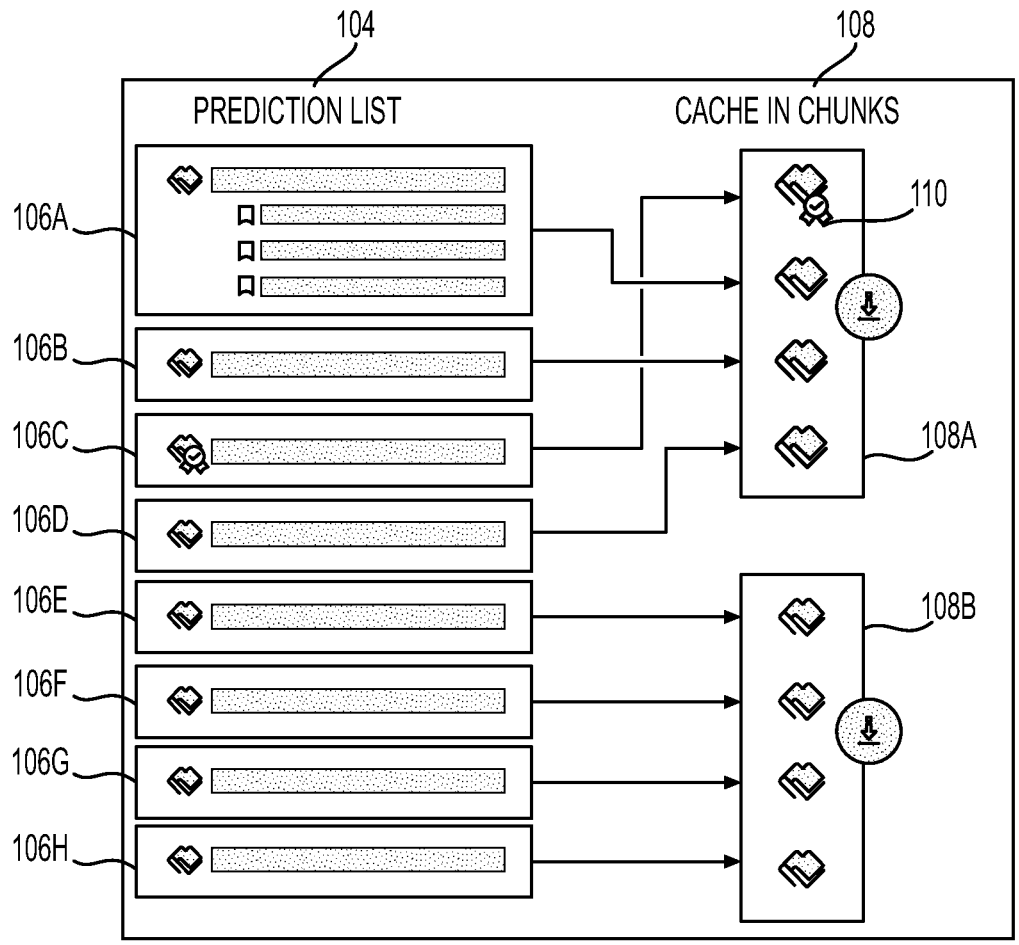
Figure 1C:
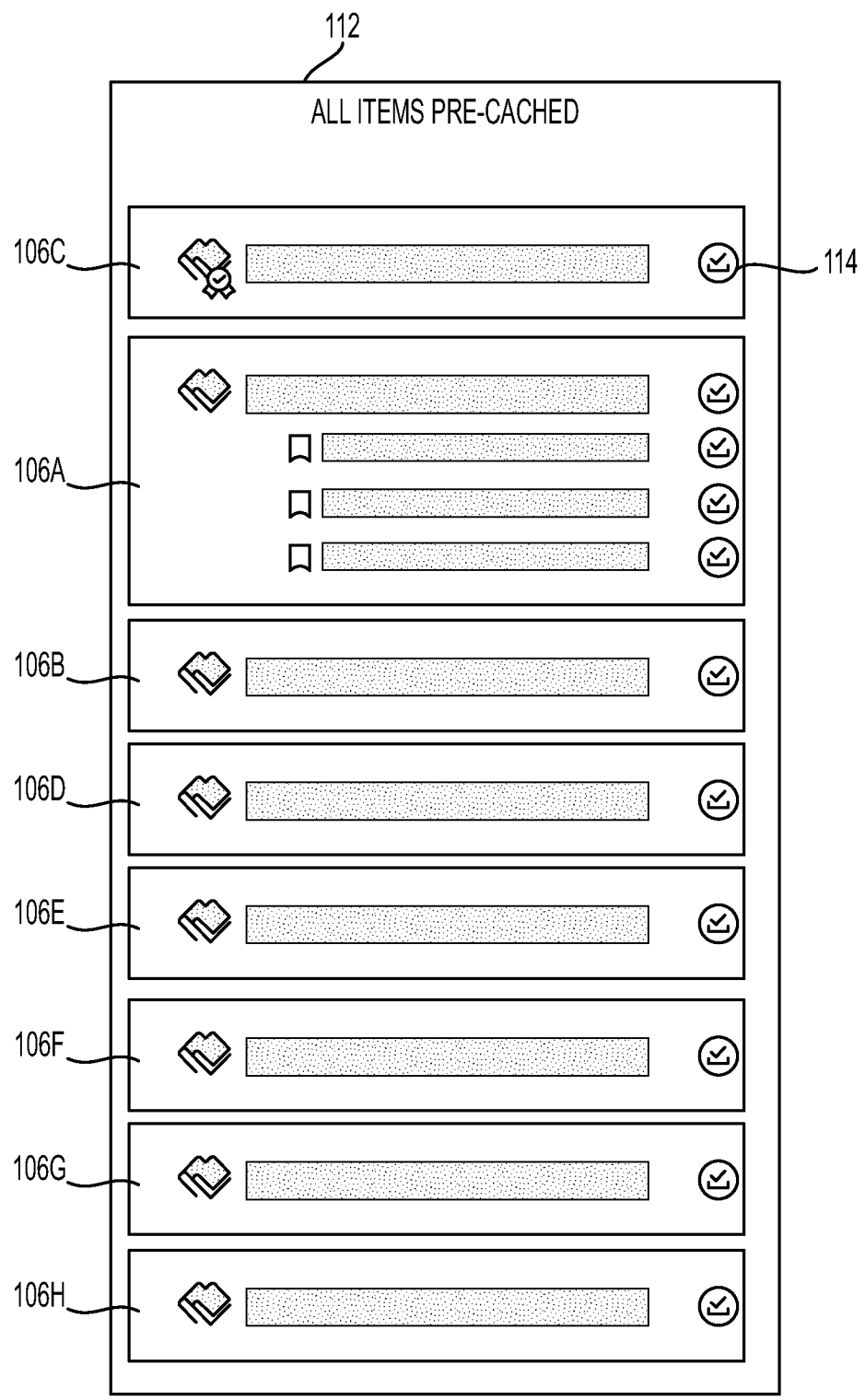

Consider a scenario in which a business user wishes to view an existing report, such as a business report or web page displayed in a graphical user interface (GUI), that relies on live data for embedded charts or tables. The user's experience would be degraded if there was a delay in viewing the report while data was loaded or if the report initially included invalid or out of date information. The user's needs may be met by a method of predictive caching according to one or more embodiments. FIGS. 1A-1C depict a process flow in an exemplary method for predictive caching, according to one or more embodiments. As shown in FIG. 1A, a requested document may be associated with one or more past user behaviors 102. For example, a user may request to open a frequently used document or one of the most recently viewed documents. Or the user may request to open a document that was recently added or recently updated. In addition, a user may request to open a document that was mentioned in a communication or other document viewed by the user, such as, for example, an email or text message received by the user, or a web page, social media page, or local document viewed by the user. A user may also request to open a document in response to an invitation to view the document sent to the user. Documents associated with such user behavior may be added to a list of predicted documents to be viewed by the user, such as prediction list 104 depicted in FIG. 1B. Prediction list 104 may include several documents that may be requested by the user, such as documents 106A-106H.

Each document 106 in prediction list 104 may be associated with a single data source or may be associated with multiple data sources, such as document 106A. Documents 106A-106H in prediction list 104 may be prioritized according to one or more factors. For example, document 106C in prediction list 104 may be designated as a "certified" or "validated" document, as indicated by a certification indicator 110, and may be given a higher priority than other documents 106 in prediction list 104. For example, a document may be certified by users with certain permissions or a verified status. Certified documents may, for example, have been reviewed by a trusted member of an organization and may be considered, for example, official sources of content, based on reliable data. Other factors in the prioritization of documents will be discussed in greater detail below. Documents 106 in prediction list 104 may be grouped, such as in chunks 108, for data downloads rather than having all document data downloaded immediately. For example, data for documents in a first chunk 108A may be downloaded first and data for documents in a second chunk 108B may be downloaded at a later time. Priority documents may be moved to the first chunk 108A, as shown with document 106C. Factors controlling the timing of chunks will be discussed in greater detail below. Following the download of data associated with each document 106 in prediction list 104, a data cache, such as data cache 112 depicted in FIG. 1C may include pre-cached data for each document 106 predicted to be opened by the user, such as may be indicated by cache update indicator 114. This process of identifying candidates for pre-caching data and downloading data for chunks of documents, may be considered as one "round" of pre-caching. Multiple rounds of pre-caching may be performed during a user's session viewing documents. However, the selection of documents to include in the prediction list may change in subsequent rounds. For example, the metrics used to add a document to the prediction list, such as, for example, a frequency of past document views, may be made more strict in subsequent rounds so that the number of document on the prediction list may be decreased. After a predetermined number of rounds, the waiting list may be created according to the methods used for the first round to possibly capture documents whose criteria may have changed since the first round was completed. A process of pre-caching may be manually disabled by a user, or may be automatically disabled based on network conditions, such as, for example, a connection to a wireless network.

FIGS. 2-6 provide further details of such predictive caching of data according to one or more embodiments.

Figure 2:
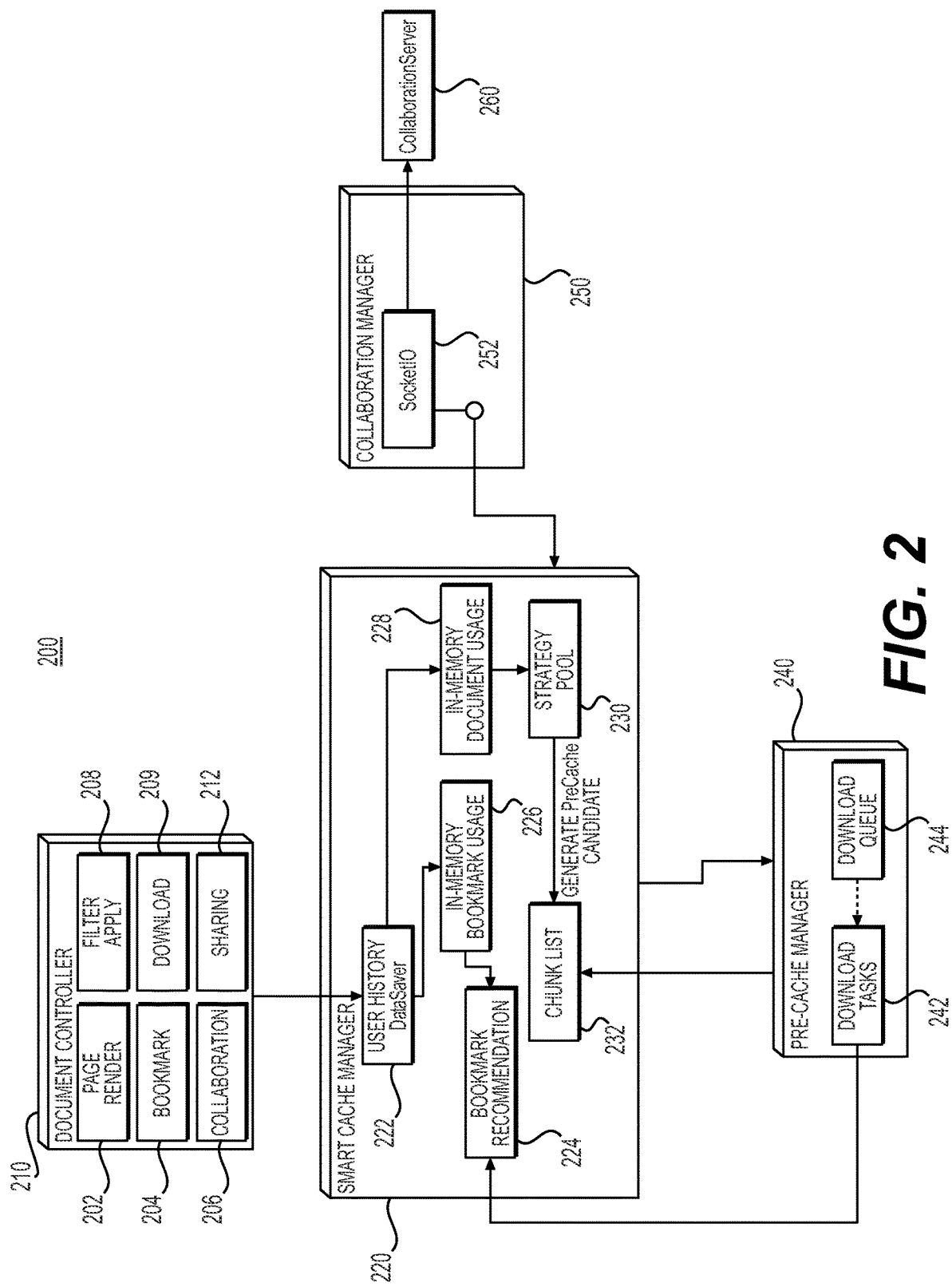
FIG. 2 depicts a system infrastructure in an exemplary method for predictive caching, according to one or more embodiments.

FIG. 2 depicts a system infrastructure 200 in an exemplary method for predictive caching, according to one or more embodiments. As shown in FIG. 2, system infrastructure 200 may include, for example: a document controller 210 to control aspects of presenting a document to a user, user interactions with the document, and providing document information for caching document data; a smart cache manager 220 to control pre-caching of document data; a pre-cache manager 240 to control starting, stopping, and resuming of pre-cache downloads; and a collaboration manager 250 in communication with a collaboration server 260 to provide information related to document collaboration to smart cache manager 220.

Changes made on one device may be used as a factor to update caches on other devices associated with each other through collaboration server 260. For example, a user may be connected to a data source through documents on two devices, a document may be cached on a mobile device, a user may change a filter on a document, or a message may be relayed to a mobile device to update the cache on the mobile device.

Document controller 210 may include, for example: a page renderer 202 to render page views of the document; a bookmark module 204 to manage bookmarks to other documents or to sections of a current document; a collaboration module 206 to manage collaboration between users, including recommendations of documents and references to documents, sharing comments on the present document, and other collaborative communications between users; a filter module 208 to manage filtering of data presented in a document; a download module 209 to manage the downloading of, for example, data rendered in the present document, other documents, media files, etc.; and a sharing module 212 to manage the sharing of data and documents between users. Information about a user's interaction with documents, including, for example, page views, collaboration and sharing with other users, interaction with document data such as filters, bookmarking, etc., may be provided to a user history data server 222 of smart cache manager 220.

Smart cache manager 220 may control pre-caching of document data using, for example, information about a user's interaction with documents provided by document controller 210 and by collaboration manager 550 through a communications module such as, for example, socket input/output module 252. A user history data server 222 of smart cache manager 220 may, in turn, provide this information to in-memory bookmark usage module 226 and in-memory document usage module 228. In-memory document usage module 228 may provide information about user document usage to strategy pool module 230 to generate a list of pre-cache candidates according to one or more pre-cache strategies. Exemplary pre-cache strategies will be discussed in greater detail below with respect to FIG. 5. Strategy pool module 230 may generate pre-cache candidates to be added to chunk list 232. Smart cache manager 220 may provide chunk list 232 to pre-cache manager 240 to manage pre-caching of data for documents on chunk list 232. For example, pre-cache manager 240 may maintain a download queue 244 of document data to be downloaded for pre-caching, each of which may, in turn, be dispatched as a download task 242. Information about the pre-cached document data may be provided to bookmark recommendation module 224 of smart cache manager 220 to be combined with information from in-memory bookmark usage module 226. Pre-cache manager 240 may notify smart cache manager 220 that downloads for a document have been completed. When all documents in a chunk have been completed, smart cache manager 220 may start a timer or otherwise pause for a predetermined time before a document for the next chunk is requested from pre-cache manager 240. This system infrastructure, or another suitable infrastructure, may be employed to perform a method of predictive caching according to one or more embodiments. Exemplary methods are described below with respect to FIGS. 3-6.

Figure 3:
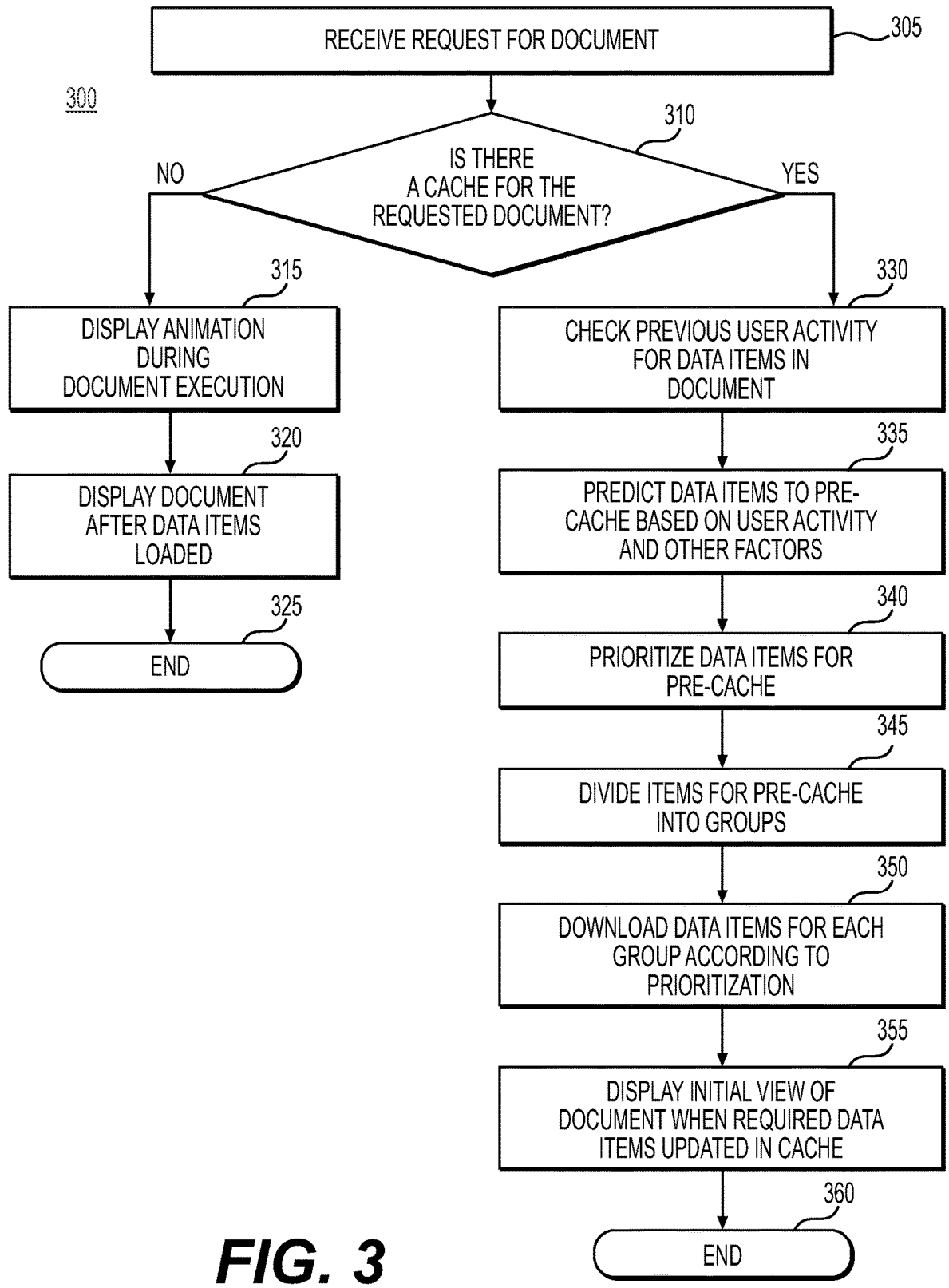
FIG. 3 depicts a flowchart of a method of predictive caching, according to one or more embodiments.

FIG. 3 depicts a flowchart of a method 300 of predictive caching, according to one or more embodiments. As shown in FIG. 3, in operation 305, the method may begin by receiving a request to display a document. In operation 310, the method may determine if there is a cache for the requested document. If there is no cache, then in operation 315, the method may display an animation during document execution, or some other indication that the document and related data are being loaded, and in operation 320, the method may display the requested document after the related data items have been loaded. The method may end at operation 325. On the other hand, if there is a cache, then in operation 330, the method may check previous user activity for data items in the requested document or in other documents previously accessed, referenced, or collaborated upon by the user. In operation 335, the method may predict data items to pre-cache based on the user activity and other factors. In operation 340, the method may prioritize data items for pre-cache. In operation 345, the method may divide the items for pre-cache into groups or "chunks." In operation 350, the method may download the data items in each group according to the determined prioritization. In operation 355, the method may display an initial view of the document when relevant data items have been updated in the cache. The method may end at operation 360. In one or more embodiments, the method might not perform operation 310 to determine if a cache is present and may perform operations 330-355 for each user session. Further details of such a method of predictive caching, corresponding to operations 330-350 are discussed below with respect to FIG. 4.

Figure 4:
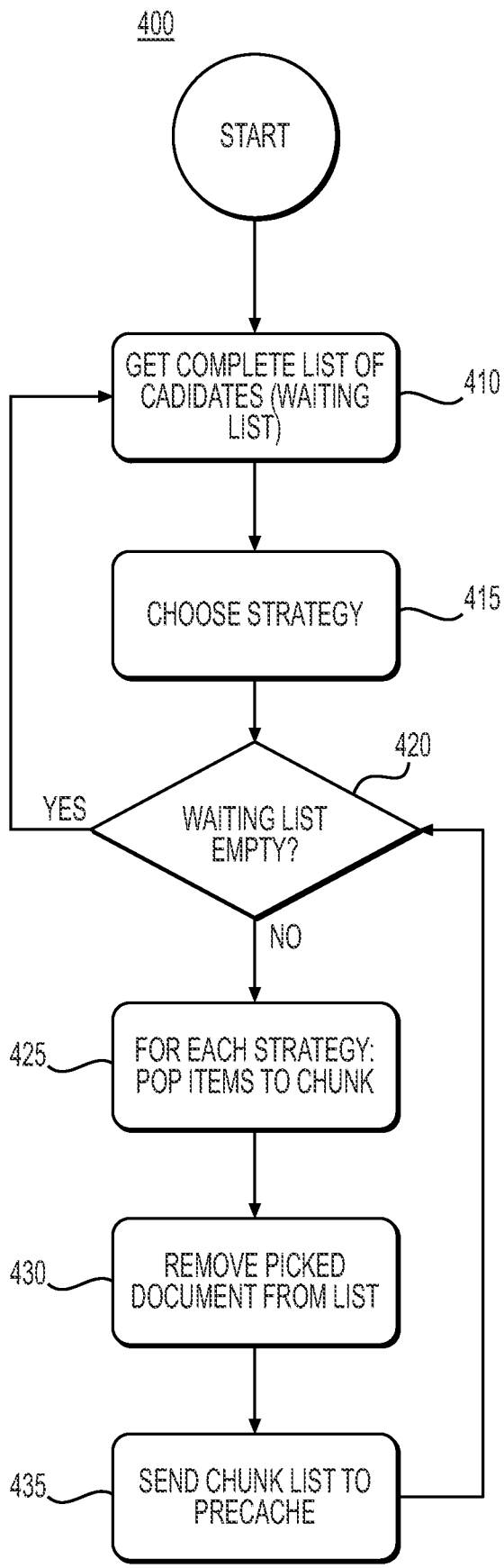
FIG. 4 depicts a flowchart of a method of predictive caching, according to one or more embodiments.

FIG. 4 depicts a flowchart of a method 400 of predictive caching, according to one or more embodiments. The method may start when a user logs on or otherwise first engages with the system. At that time, the user's usage history data may be loaded into memory to allow a determination of document candidates for pre-caching. As shown in FIG. 4, in operation 410, the method may obtain a list of candidates for downloading, which may be considered as a "waiting list" for downloads. The waiting list might not include all documents available for viewing by the user. Some documents may be excluded based on an analysis of the documents. For example, a document that has not been viewed within a predetermined period of time may be excluded from the waiting list based on a low likelihood of the document being viewed. In operation 415, the method may determine a strategy for prioritizing a prioritizing data downloads for pre-caching data. The determination of strategies will be discussed in grated detail with respect to FIG. 5, below. In operation 420, the method may determine if the waiting list is empty. If the waiting list is empty, then the method may return to operation 410. If the waiting list is not empty, then in operation 425, the method may, for data items identified according to various strategies in operation 415, add items to a grouping, or "chunk," of data items for downloading. In operation 430, the method may remove the data items and related documents from the waiting list, and in operation 435, the method may pre-cache the data items, such as by sending the chunk to a pre-caching operation, such as pre-cache manager 240 depicted in FIG. 2. The method may then return to operation 420 to determine if the waiting list is empty. The method may continue in this manner until termination criteria are met, such as, for example, no more candidate documents are available to add to a waiting list, the waiting list is empty on consecutive executions of operation 420, the user logs out or otherwise ends the session, etc.

As discussed above, documents may be selected for pre-caching based on one or more strategies. The strategies may include, for example, a last used or most recently used strategy, a most used strategy, a recently added strategy, a recently collaborated strategy, etc. In addition, a document that is designated as certified may be given a higher priority for pre-caching than a non-certified document. For example, a document may be certified by users with certain permissions or a verified status. Certified documents may, for example, have been reviewed by a trusted member of an organization and may be considered, for example, official sources of content, based on reliable data. Although documents for pre-caching may be selected at the time that a user first logs into or accesses the system, newly-created documents, or documents subject to new collaboration after pre-caching has begun may be recognized and may be given higher priority during the next round of pre-caching or in the next chunk of pre-caching in the current round.

A last used or most recently used strategy may be based on an assumption that a user will attempt to use the most recent document again soon. This strategy may include sorting some or all documents based on last access timestamps. Documents may be added to a list for pre-caching in most-recently-used order. Documents added to the list for pre-caching may be limited to documents used within a predetermined time, a fixed number of documents, etc.

A most used strategy may be based on an understanding that documents that are heavily used by a user are more likely to be used again. The determination that a document is heavily used may be based on one or more metrics, such as, for example, a document that is accessed in a predetermined proportion of document accesses (e.g., a document that accounts for 30% of all document accesses by the user would be selected for pre-caching), the average time the user spent viewing the document on recent accesses, the user's interactions with the document (e.g., certain user actions, such as editing or manipulating displayed data would indicate that a future access by the user is more likely than a document that was merely opened and closed), or a raw count of accesses by the user, etc.

A recently added strategy may be based on an assumption that a document that was recently added is more likely to be accessed than a document that has existed for a long time. Documents may be filtered based on the document creation time, such as by including documents created in a predetermined time period, documents within a predetermined percentage of recently created documents, (e.g., the most recently created 30% of all documents), a most recent number of created documents, etc.

A recently collaborated strategy may identify documents the user was invited or recommended to access by another user. The invitation may be though a direct communication to the user, though a public post, including a social media post, that identifies the user, etc. Documents that were the subject of recent collaboration may be included in a list for pre-caching, such as collaboration within a predetermined time period, a most recent number of collaborations, etc.

Other strategies may be employed in one or more embodiments. For example, a candidate for pre-caching may be selected based on a predicted next document view according to the usage pattern of the user or of other users. Such a prediction may be made based on a similarity comparison of the available documents to a user's viewed documents, and may be based on a machine learning algorithm or another artificial intelligence algorithm. In addition, one or more embodiments may predict, based on a machine learning algorithm or another artificial intelligence algorithm, one or more interactions or manipulations a user may perform on a document once viewed. Such a prediction may be factored into a list of data to be pre-cached.

Figure 5:
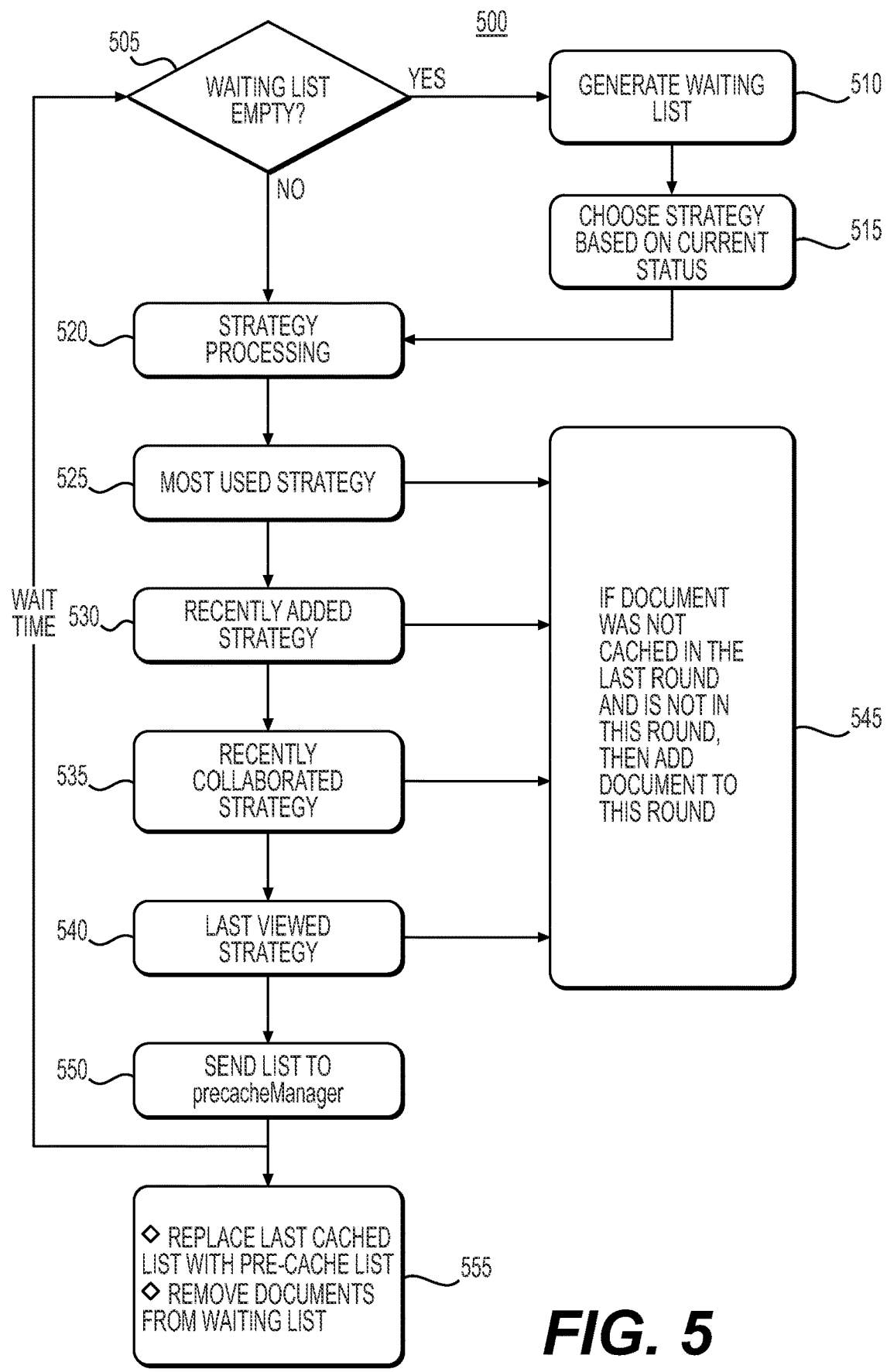
FIG. 5 depicts a flowchart of pre-caching strategies in a method of predictive caching, according to one or more embodiments.

FIG. 5 depicts a flowchart of pre-caching strategies in a method 500 of predictive caching, according to one or more embodiments. As shown in FIG. 5, in operation 505, the method may begin by determining whether a waiting list of documents to have data pre-cached is empty. If the waiting list is empty then in operation 510, the method may generate a waiting list. In operation 515, the method may determine one or more strategies for pre-caching data based on the current status of the system. In operation 520, the method may commence processing of documents in the waiting list according to the determined one or more strategies. For example, a "most used strategy" may be performed in operation 525. A "recently added strategy" may be performed in operation 530. A "recently collaborated strategy" may be performed in operation 535. A "last used strategy" may be performed in operation 540. Other strategies may also be employed in one or more embodiments, and may be processed similarly to the strategies depicted in FIG. 5. In operation 545, for each document processed by the strategies performed in operations, 525, 530, 535, and 540, if the document was not processed for pre-caching in the last round and is not yet listed to be processed in this round, then the method may add the document to the pre-cache list to be processed in this round. In operation 550, the method may return to operation 505 to determine if there are additional documents remaining in the waiting list. Returning to operation 505 may be based on a wait time, such as a delay interval to avoid overloading the server. Otherwise, in operation 555, the method may replace a last pre-cache list with the current pre-cache list, and may remove any remaining documents from the waiting list.

Predictive pre-caching of document data for a number of users across a system may put a strain on the server or servers providing the data. There is a risk that an overloaded server may prevent successful pre-caching of document data and may interfere with timely display of documents and data. Accordingly, to ensure that servers are not overloaded, a method according to one or more embodiments may request a current health check and server load level from a server, and may delay requests for pre-cached data or may generate requests in chunks with a smaller size when a server has a high current load. If a server is not able to provide health and server load level status, one or more embodiments may set predetermined intervals between server requests to spread out any additional server workload. For example, intervals may be predetermined between rounds, between chunks of the first round, and between chunks of subsequent rounds. The intervals may be the same for some or all servers and some or all users and user devices, or may be set individually according to various factors such as, for example, a number of documents on a waiting list for a user, a determined chunk size for a user, a user's priority level, a known number of active users, etc. A new chunk may be submitted for processing following the completion of a previous chunk and a delay by the specified interval.

Figure 6:
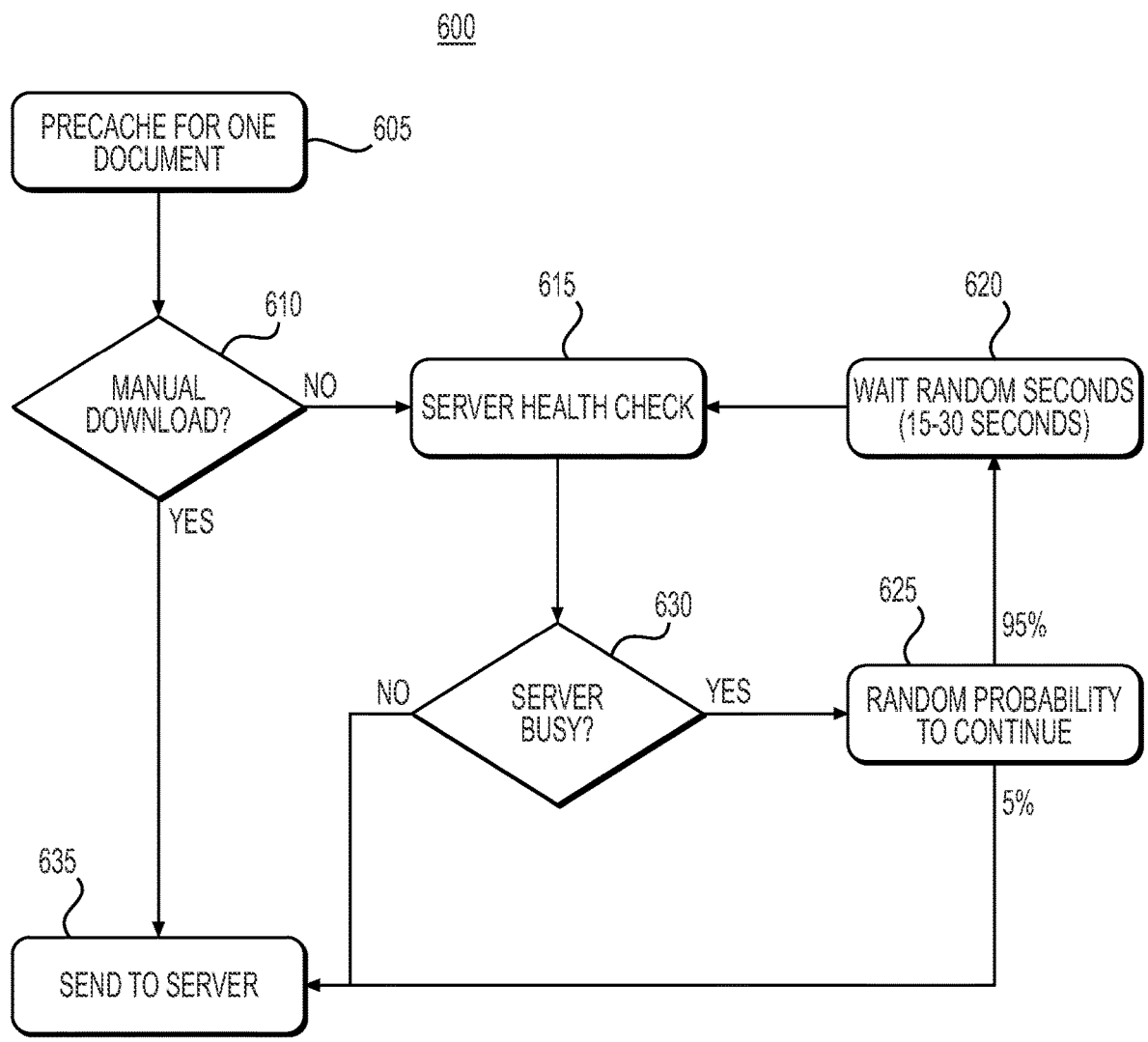
FIG. 6 depicts a flowchart of a method of managing server load during predictive caching, according to one or more embodiments.

FIG. 6 depicts a flowchart of a method 600 of managing server load during predictive caching, according to one or more embodiments. As shown in FIG. 6, the method may begin at operation 605 by receiving a pre-cache request for one document, such as a document on a pre-cache waiting list, as discussed with respect to FIGS. 4 and 5 above. At operation 610, the method may determine if the pre-cache request is a user-requested manual download. If the pre-cache request is a user-requested manual download, then the method may continue to send the request to a server at operation 635 without checking the heath of the server. If the pre-cache request is not a user-requested manual download, then the method may continue to operation 615 to check the health of the server, and at operation 630, the method may determine if the server is busy and unable to download data items. If the server is not busy, then the method may continue to send the request to a server at operation 635. If the server is busy, then the method may, at operation 625, randomly select whether to send the request to the server immediately. The random selection may be based on a probability, such as, for example, a 95% chance that the request is not sent to the server immediately. The probability value may be predetermined and fixed for some or all users and documents, or may be variable based on, for example, a user priority, whether a document is a most frequently used document, whether the request is part of a first round or a subsequent round, etc. If the request is not randomly selected to send to the server immediately, then, at operation 620, the method may wait a random period of time before again checking the health of the server at operation 615, and again checking whether the server is busy at operation 630. The random period may be fixed across some or all users and servers, or may vary according to server conditions. For example, a response to the server health check in operation 615 may include a minimum wait time before the next server health check. This process of checking whether the server is busy in operations 615 and 630, and holding the request at operations 625 and 620 before sending the request to the server, may be repeated until the request has been sent to the server. Alternatively, a request may be terminated after a number of attempts, or may be terminated by outside factors, such as Application of a method of predictive caching according to the one or more embodiments discussed above, may increase the chances that cached data stored on a device for a document is current and valid so that the document can be loaded quickly without requiring the user to wait while data is fetched. Such an improved data cache would provide an improved user experience with faster response time.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Techniques discussed herein may be executed on one or more webpages. Such web pages may execute HTML, or other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for predictive caching, the method comprising:
    determining previous user activity related to data items and/or documents;
    receiving a request to view a document from a user;
    predicting data items to pipe-cache based on the previous user activity and at least one other factor;
    prioritizing the predicted data items for pre-caching;
    dividing the prioritized data items for pre-caching into a plurality of groups;
    downloading prioritized data items for each group among the plurality of groups according to the prioritization of the predicted data items; and
    displaying a view of the document after data items, corresponding to the request, are received;
    wherein downloading prioritized data items further comprises:
    checking a status of a server from which the data items will be downloaded and a load level of the server from which the data items will be downloaded;
    determining that the server is unable to download the data items;
    upon determining that the server is unable to download the data items, applying a probability to determine not to send a request for the data items to the sever;
    upon determining not to send the request to the server, waiting a random time interval; and
    re-checking the status of the server and the load level of the server.

2. The computer-implemented method of claim 1, wherein predicting data items to pre-cache is performed according to documents most recently used by the user, documents most used by the user, recently added documents, and/or documents recently collaborated upon by the user.

3. The computer-implemented method of claim 1, further comprising:
    downloading data items for a first group among the plurality of groups;
    waiting a predetermined period of time; and
    downloading data items for a first group among the plurality of groups.

4. The computer-implemented method of claim 1, wherein a predicted data item that is certified by an administrator has a higher priority for downloading.

5. The computer-implemented method of claim 1, wherein data items related to a newly-created document or data items related to a document subject to a new collaboration have a higher priority for downloading.

6. The computer-implemented method of claim 1, wherein a number of data items in each group is determined based on a load level of a server from which the data items will be downloaded.

7. A system for predictive caching, the system comprising:
    at least one data storage device storing instructions for predictive caching in an electronic storage medium; and
    at least one processor configured to execute the instructions to perform a method including:
    determining previous user activity related to data items and/or documents;
    receiving a request to view a document from a user;
    predicting data items to pre-cache based on the previous user activity and at least one other factor;
    prioritizing the predicted data items for pre-caching;
    dividing the prioritized data items for pre-caching into a plurality of groups;
    downloading prioritized data items for each group among the plurality of groups according to the prioritization of the predicted data items; and
    displaying a view of the document after data items, corresponding to the request, are received;
    wherein downloading prioritized data items further comprises:
    checking a status of a server from which the data items will be downloaded and a load level of the server from which the data items will be downloaded;
    determining that the server is unable to download the data items;
    upon determining that the server is unable to download the data items, applying a probability to determine not to send a request for the data items to the server;
    upon determining not to send the request to the server, waiting a random time interval; and
    re-checking the status of the server and the load level of the server.

8. The system of claim 7, wherein predicting data items to pre-cache is performed according to documents most recently used by the user, documents most used by the user, recently added documents, and documents recently collaborated upon by the user.

9. The system of claim 7, wherein the system is further configured for:
    downloading data items for a first group among the plurality of groups;
    waiting a predetermined period of time; and
    downloading data items for a first group among the plurality of groups.

10. The system of claim 7, wherein a predicted data item that is certified by an administrator has a higher priority for downloading.

11. The system of claim 7, wherein data items related to a newly-created document or data items related to a document subject to a new collaboration have a higher priority for downloading.

12. The system of claim 7, wherein a number of data items in each group is determined based on a load level of a server from which the data items will be downloaded.

13. A non-transitory machine-readable medium storing instructions that, when executed by a computing system, causes the computing system to perform a method for predictive caching, the method including:
- determining previous user activity related to data items and/or documents;
- receiving a request to view a document from a user;
- predicting data items to pre-cache based on the previous user activity and at least one other factor;
- prioritizing the predicted data items for pre-caching;
- dividing the prioritized data items for pre-caching into a plurality of groups;
- downloading prioritized data items for each group among the plurality of groups according to the prioritization of the predicted data items; and
- displaying a view of the document after data items, corresponding to the request, are received;
- wherein downloading prioritized data items further comprises:
  - checking a status of a server from which the data items will be downloaded and a load level of the server from which the data items will be downloaded;
  - determining that the server is unable to download the data items;
  - upon determining that the server is unable to download the data items, applying a probability to determine not to send a request for the data items to the server;
  - upon determining not to send the request to the server, waiting a random time interval; and
  - re-checking the status of the server and the load level of the server.

14. The non-transitory machine-readable medium of claim 13, wherein predicting data items to pre-cache is performed according to documents most recently used by the user, documents most used by the user, recently added documents, and documents recently collaborated upon by the user.

15. The non-transitory machine-readable medium of claim 13, the method further comprising:
- downloading data items for a first group among the plurality of groups;
- waiting a predetermined period of time; and
- downloading data items for a first group among the plurality of groups.

16. The non-transitory machine-readable medium of claim 15, wherein a predicted data item that is certified by an administrator has a higher priority for downloading.

17. The non-transitory machine-readable medium of claim 15, wherein data items related to a newly-created document or data items related to a document subject to a new collaboration have a higher priority for downloading.

* * * * *

UNITED STATES PATENT AND TRADEMARK OFFICE
CERTIFICATE OF CORRECTION

PATENT NO. : 11,386,183 B2
APPLICATION NO. : 17/382512
DATED : July 12, 2022
INVENTOR(S) : Chi Ho Yoon et al.

It is certified that error appears in the above-identified patent and that said Letters Patent is hereby corrected as shown below:

In the Claims

Column 11, Line 42, in Claim 1, delete "pipe-cache" and insert --pre-cache--.
Column 11, Line 61, in Claim 1, delete "sever" and insert --server--.

Signed and Sealed this
Eighth Day of November, 2022

Katherine Kelly Vidal
*Director of the United States Patent and Trademark Office*